United States Patent
Hsu

[11] Patent Number: 5,860,065
[45] Date of Patent: Jan. 12, 1999

[54] APPARATUS AND METHOD FOR AUTOMATICALLY PROVIDING BACKGROUND MUSIC FOR A CARD MESSAGE RECORDING SYSTEM

[75] Inventor: Jerry Hsu, Tainan, Taiwan

[73] Assignee: United Microelectronics Corp., Hsinchu, Taiwan

[21] Appl. No.: 731,727

[22] Filed: Oct. 21, 1996

[51] Int. Cl.[6] .............................. G10L 3/02; G10L 5/02; G10L 9/00
[52] U.S. Cl. ................... 704/270; 704/201; 40/124.03
[58] Field of Search .................... 704/201, 258, 704/270, 275; 40/124.03, 455

[56] References Cited

U.S. PATENT DOCUMENTS

| | | | |
|---|---|---|---|
| 4,596,032 | 6/1986 | Sakurai | 704/270 |
| 4,677,657 | 6/1987 | Nagata et al. | 704/270 |
| 4,717,261 | 1/1988 | Kita et al. | 704/258 |
| 4,945,805 | 8/1990 | Hour | 704/270 |
| 5,045,327 | 9/1991 | Tarlow et al. | 704/270 |
| 5,063,698 | 11/1991 | Johnson et al. | 40/124.03 |
| 5,266,034 | 11/1993 | Mitz | 704/201 |
| 5,286,912 | 2/1994 | Yamaguchi | 84/616 |
| 5,301,259 | 4/1994 | Gibson et al. | 704/258 |
| 5,349,480 | 9/1994 | Takao | 360/74.1 |
| 5,569,038 | 10/1996 | Tubman et al. | 84/634 |
| 5,671,555 | 9/1997 | Fernandes | 40/124.03 |
| 5,748,082 | 3/1998 | Payne | 340/568 |

*Primary Examiner*—David R. Hudspeth
*Assistant Examiner*—Patrick N. Edouard
*Attorney, Agent, or Firm*—Sughrue, Mion, Zinn, Macpeak & Seas, PLLC

[57] ABSTRACT

The invention relates to a method and an apparatus for automatically providing background music for a card message recording system thereby to enhance the feature of a conventional card recording system. The invention mainly comprises a speech analyzer, a memory, a speech synthesizer, a melody generator, a mixer and a speaker. At recording mode, the message is processed in speech analyzer and then stored in the memory. At playing mode, the message is read and processed in speech synthesizer. Then the mixer reads the message and the background music at proper time intervals such that when the volume of the message is increased, the volume of the musical signals fades and vice versa. Consequently, the mixed signals are played out by the speaker.

7 Claims, 2 Drawing Sheets

APPARATUS AND METHOD FOR AUTOMATICALLY PROVIDING BACKGROUND MUSIC FOR A CARD MESSAGE RECORDING SYSTEM

BACKGROUND OF THE INVENTION

1. Field of the Invention

The invention relates to an apparatus and method for a card message recording system, especially to a card message recording system which can automatically provide background music.

2. Description of the Prior Art

A card recording system usually called R&P (Record and Playback) is a small IC attached to a card for greetings, birthday, Christmas or any special event. Currently the card message recording systems available on the market provide the functions of message recording and playing. People can leave their messages in the card recording system and then send it to the card receiver. As the card receiver opens the card, the messages will automatically be played back.

The card message recording system is different from a tape recorder even though they both can record and play messages. The card message recording system is especially designed for leaving short vocal message on the card. As the cost and application are concerned, it must be small, lightweight, and cheap. Generally, it is an IC which can convert voice/speech signals into digital signals and then store the digital signals in a memory. When the playing mode is enabled, the message is read out from the memory and converted back to speech and then played out. Consequently, the card receiver can hear the message from the card sender. Despite the interesting features of the conventional card recording systems, they still cannot automatically provide background music or sound effects for the users.

SUMMARY OF THE INVENTION

Accordingly, it is an object of the present invention to provide an apparatus and method for automatically providing background music or background sound effects for a card message recording system.

It is another object of the present invention to provide a low-cost, easy-to-implement card message recording system which can automatically provide background music and then mix the background music with the speech message for the user.

Briefly described, the present invention encompasses a method of synthesizing message with background music for a card message recording system. The steps of the inventive method include the following steps: (a) converting speech signals into digitized speech signals at recording mode; (b) compressing the digitized speech signals; (c) storing the digitized speech signals; (d) reading and decompressing the digitized speech signals at playing mode; (e) converting the digitized speech signals into analog speech signals; and (f) mixing the analog speech signals and the background musical signals; and when the volume of said speech signals is increased, the volume of electric musical signals fades and vice versa.

The present invention also encompasses an apparatus for automatically providing background music for a card message recording system. The invention mainly comprises a speech analyzer, a memory, a speech synthesizer, a melody generator, a mixer and a speaker. At recording mode, the message is processed in speech analyzer and then stored in the memory. At playing mode, the message is read and processed in speech synthesizer. Then the mixer reads the message and the background music at proper time intervals such that when the volume of the message is increased, the volume of the musical signals fades and vice versa. Consequently, the mixed signals are played out by the speaker.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

It is known that musical signals and speech signals are usually processed separately because their data formats are completely different. Nevertheless, using two-channel speech which can read both speech signals and musical signals allows the musical signals to be processed in the same way as speech signals. The advantage for this approach is that it can process vocal music even though its cost is higher. The other approach that is cheaper, simpler and more likely to apply for commercial purposes is using an electric melody generator to generate melodies and then combining them with speech signals. The trade-off for the latter approach is that it cannot process vocal music. Considering these two approaches, the invention can control the time intervals for the background music and the message so that the volume of the background music fades while the volume of the message is increasing and vice versa. Accordingly, two preferred embodiments of the invention are provided and explained in detail below.

Figure 1:
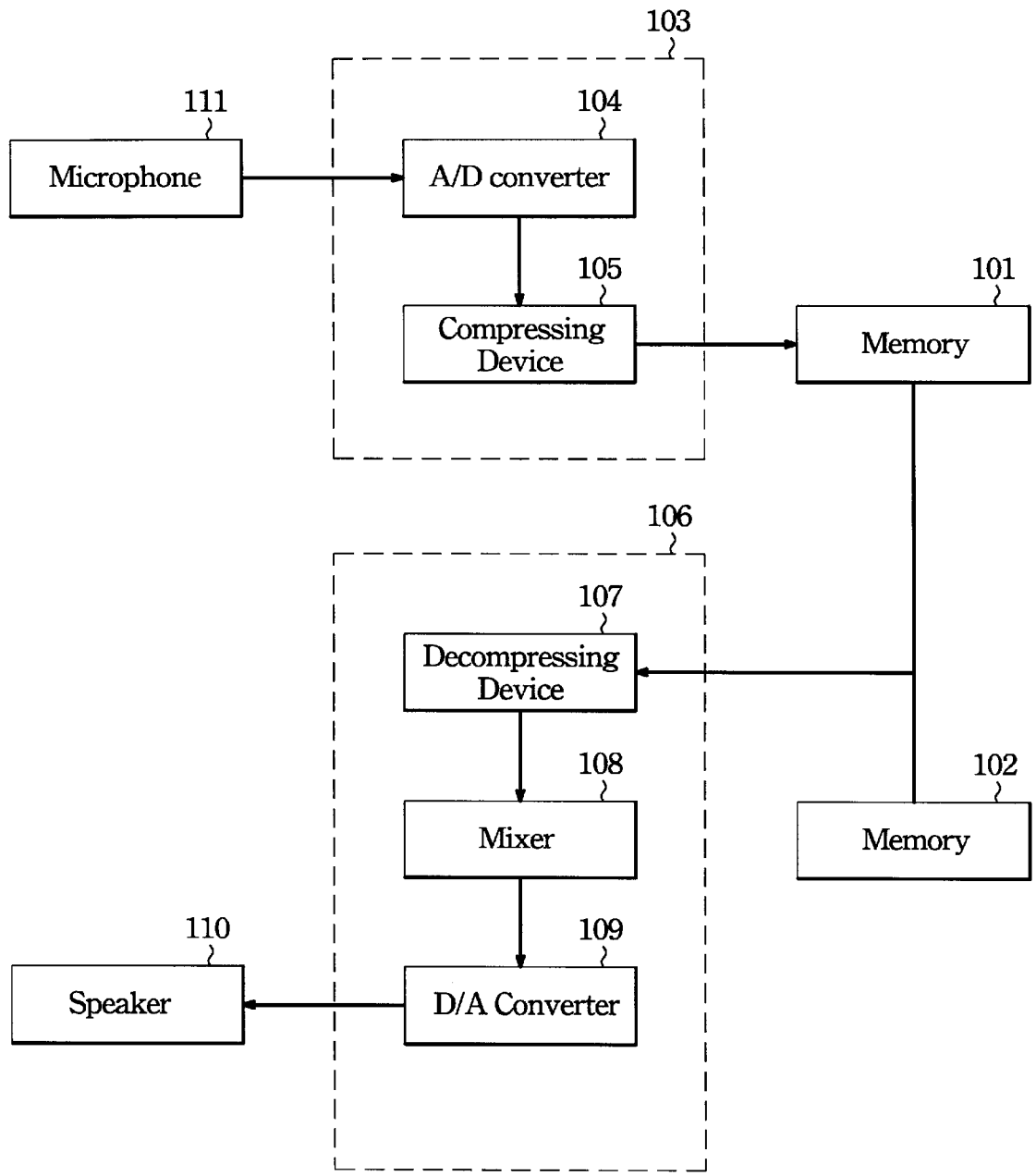
FIG. 1 is a block diagram showing the preferred embodiment of the invention.

FIG. 1 shows the preferred embodiment of the present invention that follows the two-channel speech approach. The functional blocks illustrate the devices on the IC. Refer to FIG. 1, memory 102 is for storing background musical signals. It can be implemented as a Mask ROM, an EPROM, an EEPROM or a Flash memory for recording background music or sound effects in advance. The card sender's message is stored in memory 101 which is better implemented as a RAM, an EPROM, an EEPROM, or a Flash Memory. The procedure of converting speech signals to digital signals is done in speech analyzer 103 which mainly includes an A/D converter 104, and a compressing device 105. On the other hand, the procedure of converting digital signals back to speech signals is done in speech synthesizer 106 which includes a decompressing device 107, a mixer 108 and a D/A converter 109.

At recording mode, the sender leaves his/her message through a microphone 111. The speech signals are then forwarded to A/D converter 104 to be converted to digital signals. To reduce the size of the digital speech signals, the digital speech signals are encoded in PCM, ADPCM or u-LAW by compressing device 105. The compressed speech signals are stored in memory 101. When the card receiver opens the card, the playing mode is enabled. The speech signals and the background musical signals stored in memory 101 and memory 102 respectively are read out at proper time intervals and forwarded to speech synthesizer 106 for signal combination. In the speech synthesizer 106, the two signals are sent to two-channel decompressing device 107 for decoding in u-LAW or ADPCM. The decoded signals are forwarded to mixer 108 which mixes the speech signals and the background musical signals together by controlling their volume at a proper time interval. After that, the synthesized signals are sent to D/A converter 109 for converting back into analog signals. Consequently, the card receiver can hear the message through speaker 110. During the procedure of signal combination at mixer 108, the volume of the background music fades gradually while the volume of the message is increasing. When the message is finished, the volume of the background music gradually increases. Thus, it produces the effect of background music for the message.

Figure 2:
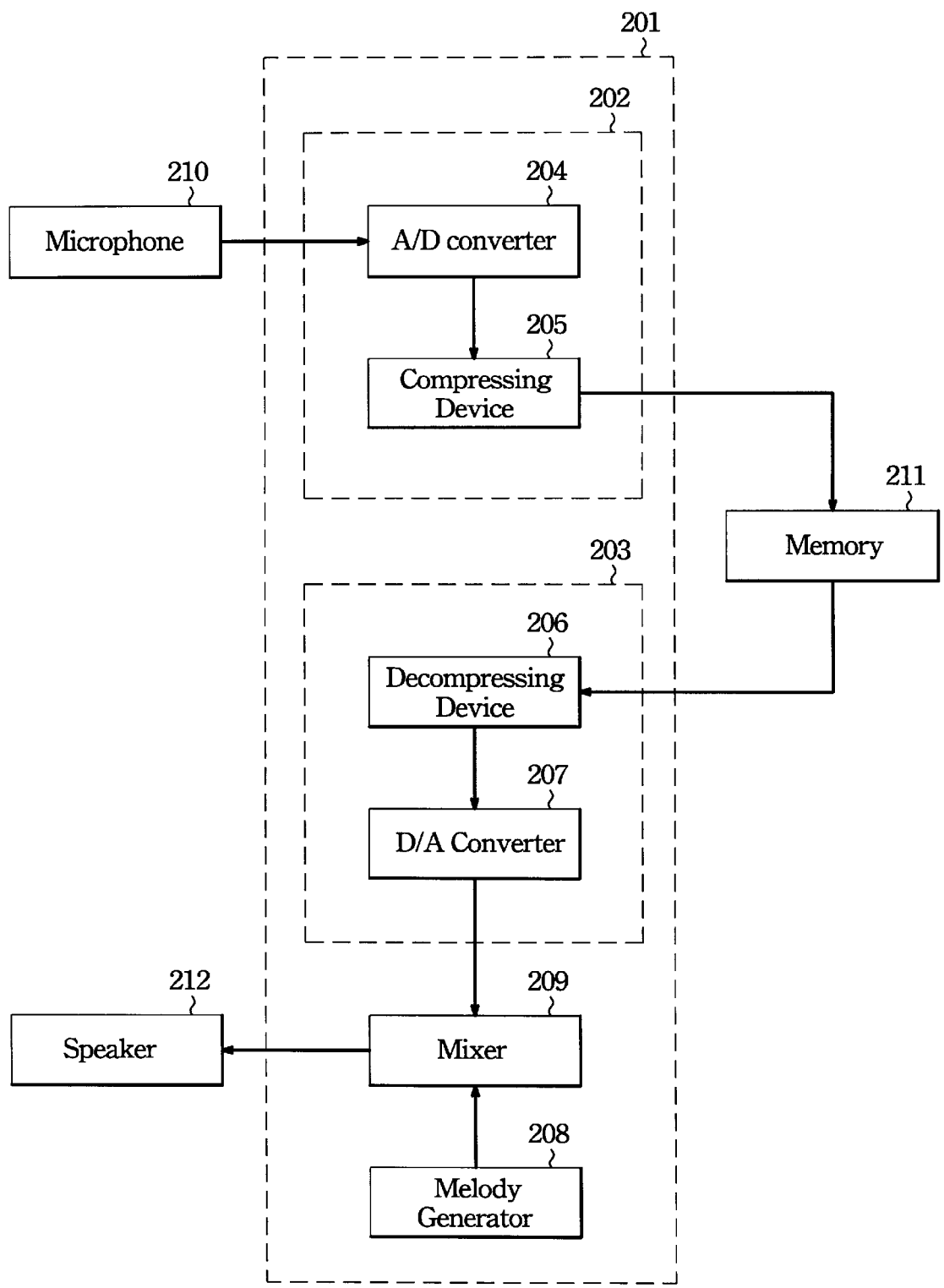
FIG. 2 is a block diagram showing another preferred embodiment of the invention.

For a lower-cost implementation, the card message recording system can use an electric melody generator to generate melodies. For this approach, the speech is processed independently from music. As FIG. 2 shows, melody generator 208 is attached to the R&P IC 201. The R&P IC 201 is responsible for speech processing only. It mainly includes a speech analyzer 202, and a speech synthesizer 203. The speech analyzer 202 includes an A/D converter 204, and a compressing device 205. The speech synthesizer 203 includes a decompressing device 206 and a D/A converter 207. Melody generator 208 is an electric melody generator which can generate simple melodies or sound effects. The volume of melody generator 208 is controlled by a mixer 209 and then forwarded to speaker 212. Mixer 209 mixes the background music with the speech signals by controlling their volume. For instance, the volume of the background music fades gradually when the volume of the message is increasing and vice versa.

At recording mode, speech signals are input to speech analyzer 202 through microphone 210. Speech signals are converted to digital signals by A/D converter 204. The speech signals are encoded in PCM, ADPCM or u-LAW by compressing device 205 and then stored in memory 211. At playing mode, the speech signals are read out from memory 211 and forwarded to speech synthesizer 203. First, the speech signals are decoded in PCM, ADPCM, u-LAW in decompressing device 206. The decompressed speech signals are forwarded to D/A converter 207 to be converted to analog signals. Mixer 209 mixes analog speech signals from D/A converter 207 and background musical signals from Melody generator 208 by controlling their volumes for playing out. Finally, the mixed signals are output through speaker 212. What the card receiver will hear is a piece of message with a piece of background music. When the volume of the speech signals is increasing, the volume of the background musical signals fades and vice versa.

The difference between the devices of FIG. 1 and FIG. 2 is that the device of FIG. 1 processes musical signals and speech signals in the same way while the device of FIG. 2 uses a simple melody generator to generate musical signals. Accordingly, the method for providing background musical signals for a card message recording system can be summarized in the following steps:

(a) converting speech signals into digitized speech signals at recording mode;
(b) compressing the digitized speech signals;
(c) storing the digitized speech signals;
(d) reading and decompressing the digitized speech signals at playing mode;
(e) converting the digitized speech signals into analog speech signals; and
(f) mixing the analog speech signals and the background musical signals. When the volume of the speech signals is increasing, the electric musical signals fades gradually and vice versa.

It should be understood that various alternatives to the structures described herein may be employed in practicing the present invention. It is intended that the following claims define the invention and that the structure within the scope of these claims and their equivalents be covered thereby.

What is claimed is:

1. An apparatus attached to a greeting-type card for automatically providing background music while playing back voice messages, comprising:

a greeting-type card;

speech analyzing means for inputting speech signals from a microphone and outputting digitized speech signals in a recording mode;

memory means for storing said digitized speech signals;

speech synthesizing means for reading said digitized speech signals from said memory means and outputting analog speech signals in a playing mode;

melody generating means for generating electric musical signals;

mixing means for receiving said analog speech signals and said musical signals and outputting mixing signals in a manner that the volume of said musical signals decreases while the volume of said speech signals increases; and means for enabling said playing mode when said card is opened.

2. The apparatus as claimed in claim 1, wherein said speech analyzing means comprising:

an A/D converter for inputting said speech signals and outputting digitized speech signals; and compressing means for inputting said digitized speech signals and outputting compressed speech signals.

3. The apparatus as claimed in claim 1, wherein said speech synthesizing means comprising:

decompressing means for reading said compressed speech signals from said memory means and outputting decompressed speech signals; and a D/A converter for inputting said decompressed speech signals and outputting analog speech signals.

4. An apparatus attached to a card for automatically providing background music while playing back recorded voice messages, comprising:

a greeting-type card;

A/D converting means for receiving analog speech signals from a microphone and outputting digitized speech signals in a recording mode;

compressing means for inputting said digitized speech signals and outputting compressed speech signals;

first memory means for storing said compressed speech signals;

second memory means for storing background musical signals;

two-channel decompressing means for inputting said compressed speech signals and said background musical signals, and outputting decompressed speech signals and decompressed background musical signals in a playing mode;

mixing means for inputting said decompressed speech signals and said decompressed background musical signals, and outputting synthesized signals;

D/A converting means for inputting said synthesized signals and outputting analog synthesized signals in a manner that the volume of said background musical signals decreases and the volume of said speech signals increases; and means for enabling said playing mode when said card is opened.

5. An apparatus attached to a greeting-type card for automatically providing background music while recording messages, comprising:

a greeting-type card;

A/D converting means for receiving analog speech signals and outputting digitized speech signals at recording mode;

compressing means for inputting said digitized speech signals and outputting compressed speech signals;

memory means for storing said compressed speech signals;

melody generating means for generating electric musical signals;

decompressing means for reading said compressed speech signals from said memory means and outputting decompressed speech signals at playing mode;

D/A converting means for inputting said decompressed speech signals and outputting analog speech signals;

mixing means for inputting said analog speech signals and said electric musical signals, and outputting mixed signals in a manner that the volume of said electric musical signals decreases and the volume of said speech signals increases; and means for enabling said playing mode when said card is opened.

6. A method for automatically providing background musical signals for a card message recording system while playing back messages recorded on a greeting-type card comprising the steps of:

in a recording mode, converting speech signals into digitized speech signals;
compressing said digitized speech signals; and
storing said digitized speech signals;

in a playback mode, enabling said card message recording system by opening said card;

decompressing and reading said digitized speech signals;

converting said digitized speech signals into analog speech signals;

generating electric musical signals;

mixing said analog speech signals and said electric musical signals; and outputting said analog speech signals and said electric musical signals in a manner that the volume of said analog speech signals and the volume of said electric musical signals are opposite.

7. The method as claimed in claim 6 further comprising the step of:

recording said electric musical signals in advance.

* * * * *